H. F. A. KLEINSCHMIDT.
ADJUSTABLE WHEEL AND AXLE.
APPLICATION FILED FEB. 21, 1919.
1,315,672.
Patented Sept. 9, 1919.
3 SHEETS—SHEET 3.
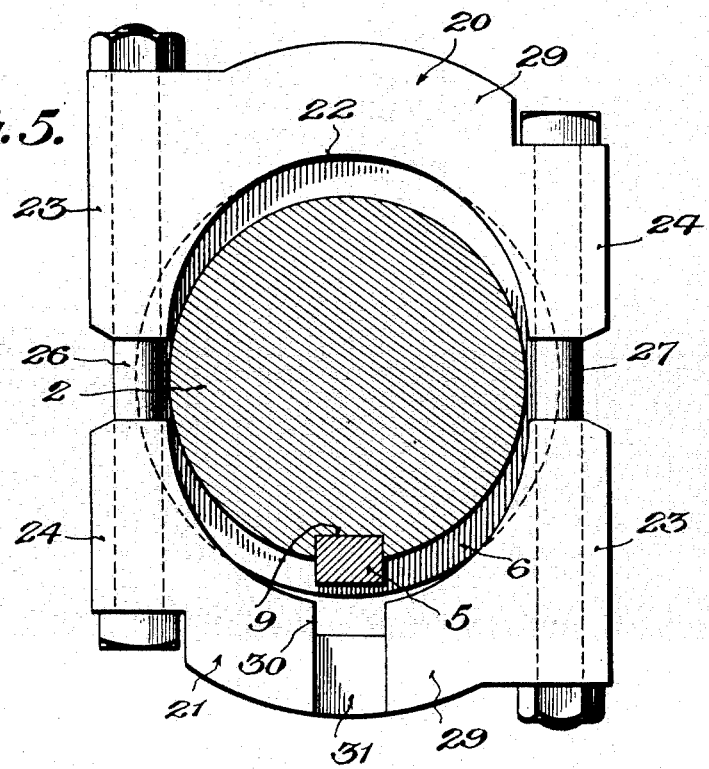
Fig. 5.
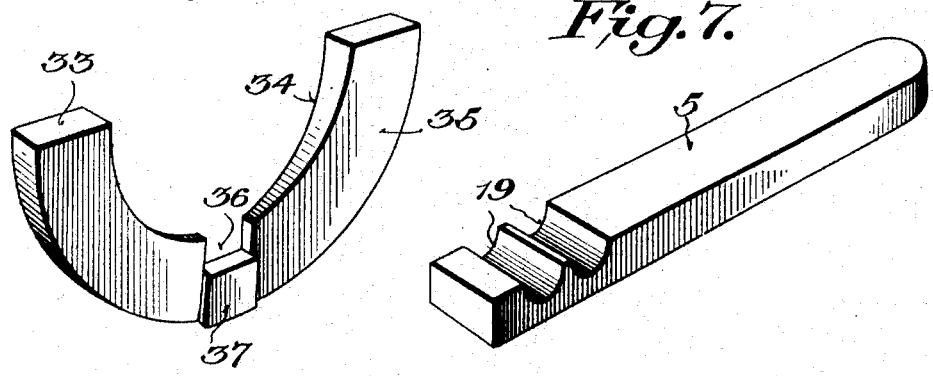
Fig. 6.
Fig. 7.
Witness
Chas. L. Griesbauer
Inventor
H. F. A. Kleinschmidt,
By D. Anthony Usina.
Attorney

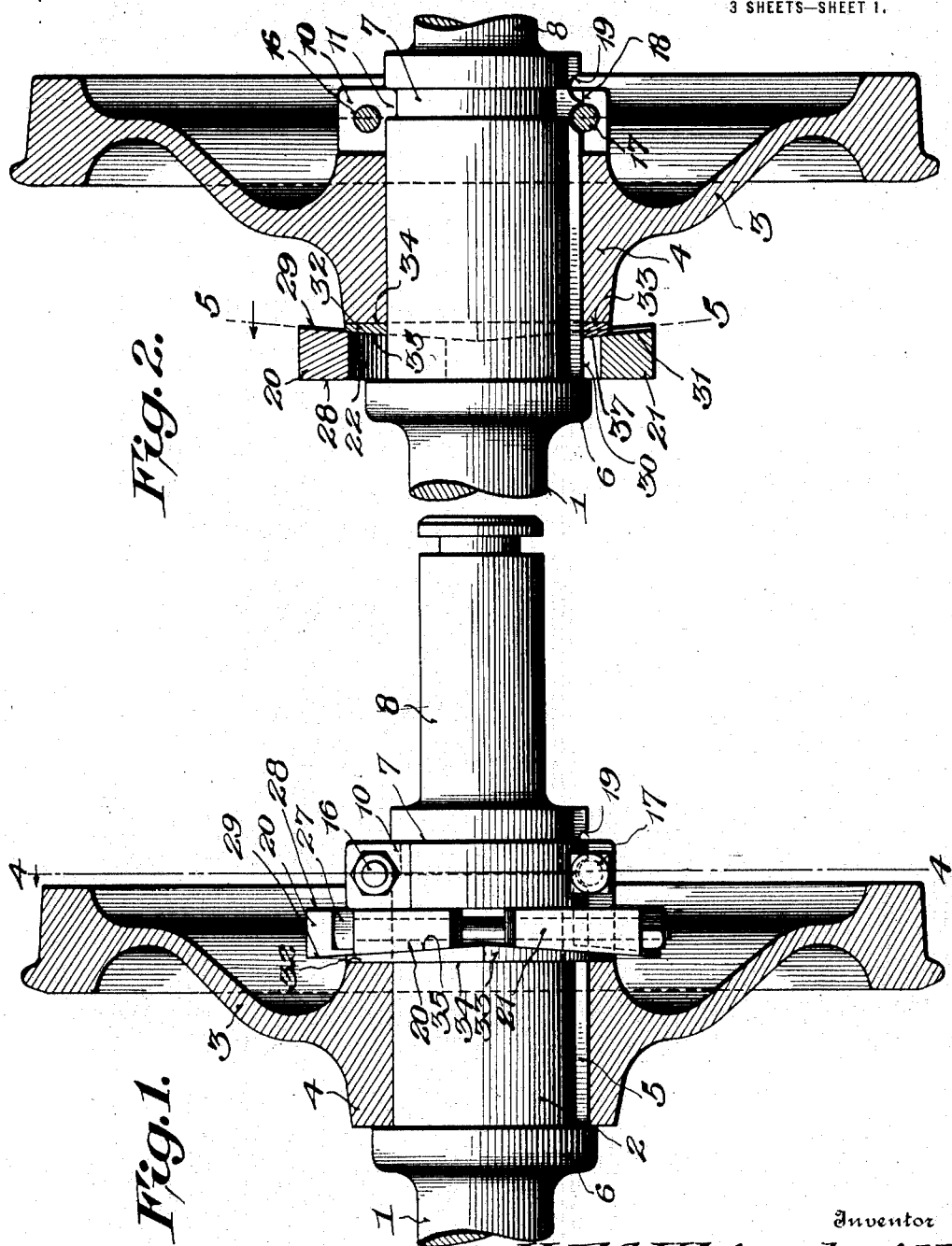

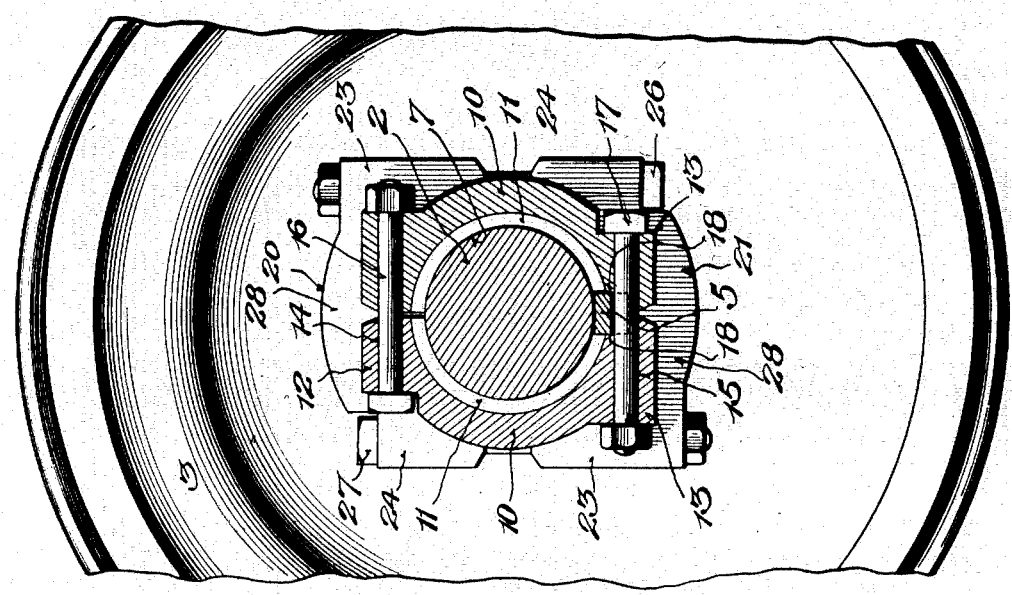

UNITED STATES PATENT OFFICE.

HENRY F. A. KLEINSCHMIDT, OF JOHNSTOWN, PENNSYLVANIA.

ADJUSTABLE WHEEL AND AXLE.

1,315,672.　　　Specification of Letters Patent.　　Patented Sept. 9, 1919.

Application filed February 21, 1919. Serial No. 278,495.

*To all whom it may concern:*

Be it known that I, HENRY F. A. KLEINSCHMIDT, a citizen of the United States, and resident of Johnstown, in the county of Cambria and State of Pennsylvania, have invented certain new and useful Improvements in Adjustable Wheels and Axles, of which the following is a specification.

This invention is an adjustable mounting for car wheels, whereby the wheels may be set to any desired gage on the axle.

Important advantages of the invention are to obtain any desired adjustments without removing the wheels from the axle and without removing axles from the trucks; to obviate the use of threads on the axles as have hitherto been used; to facilitate the adjustable shifting of the wheel on the axle; and to maintain a rigid connection between the wheel and the axle so that the wheel may rotate with the axle.

With these and other objects in view, the present invention consists in the combination and arrangement of parts as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

In the drawings:

Figure 1 is a side elevation of one end portion of a rotatable car axle embodying the features of the present invention, a car wheel being shown in section and at its inner limit on the axle.

Fig. 2 is a similar view showing the wheel in an intermediate position and the several parts in section.

Fig. 3 is a similar view showing the wheel at its outer limit.

Fig. 4 is a sectional view on the line 4—4 of Fig. 1.

Fig. 5 is an enlarged sectional view on the line 5—5 of Fig. 2.

Fig. 6 is a detailed perspective view of one of the filler or washer members.

Fig. 7 is a detailed perspective view of the key for keying the wheel and the other parts of the device to the axle.

The axle 1 is provided at each end with a cylindrical seat portion 2, on which any ordinary or preferred form of wheel 3 is mounted, said wheel having a hub 4 which is keyed to the seat portion of the axle by means of a suitable key 5. At the inner end of the seat there is an integral annular shoulder 6, and adjacent the outer end of the seat there is an annular groove 7. At the outer side of the seat there is the usual spindle portion 8 designed to rotate within a journal box in the usual manner. As best shown in Fig. 5 of the drawings, it will be seen that the wheel seat 2 of the axle is provided with a keyway 9 to receive the key 5, and as indicated in Figs. 1, 2 and 3 it will be seen that this keyway extends throughout the length of the wheel seat 2, being closed at its inner end by the annular shoulder 2 and open at its outer end to permit of the ready introduction and removal of the key.

Coöperating with the annular groove 7 is a removable and reversible shoulder or abutment made up of duplicate sections 10, each section being provided at its inner edge with a semicylindrical opening to receive the axle, and on the wall of this semicircular opening there is a longitudinal rib 11 of the size and shape to fit snugly the groove 7 of the axle. The outer face of this rib is flush with one of the outer faces of the abutment section 10, and the width of the rib is slightly less than one-half that of the abutment section, wherefore said rib 11 is offset with respect to the longitudinal center of the abutment, for a purpose as will be hereinafter described. The ends of each abutment section are enlarged or provided with the respective bosses 12 and 13, and these bosses are provided with the parallel bolt openings 14 and 15, respectively. Two such abutment segments or sections are applied to the wheel seat 2 of the axle, as best shown in Fig. 4 of the drawings, and are clamped in place by means of the bolts 16 and 17 passing through the bolt openings 14 and 15, respectively. A groove 18 is formed transversely across the inner periphery of each abutment section 10, and the registered grooves of the two sections constitute a keyway to accommodate the key 5. As best shown in Fig. 7, it will be seen that the key 5 is provided upon one face with transverse notches or seats 19, one or the other of which is designed to accommodate the bolt 17, according to the position of the removable abutment on the wheel seat 2, as will be understood by reference to Figs. 2 and 3 of the drawings. When the removable abutment is thus fitted in place, it is held against movement endwise of the axle by the interfitting of the rib 11 in the groove 7, and is prevented from rotating upon the axle by reason of the key 5. Moreover the bolt 17 holds the key 5 in place and prevents endwise displacement thereof.

The distance between the fixed shoulder or abutment 6 and the removable abutment 10 exceeds the length of the hub 4 of the wheel, and in order that the hub of the wheel may be held firmly between the two abutments there is provided suitable wedging means which may be interposed between either of the abutments and the adjacent end of the wheel hub. This wedging means includes a collar made up of substantially duplicate sections 20 and 21, each of which is provided with a semicylindrical opening 22 to receive the wheel seat 2. The ends of each wedge section are provided with bosses 23 and 24 respectively, and suitable bolts 26 and 27 extend through the adjacent bosses of the two wedge sections whereby the latter may be drawn toward one another upon the wheel seat. As best indicated in Figs. 1, 2 and 3 of the drawings it will be seen that corresponding faces 28 of the wedge sections are straight and lie in the same plane, while the opposite faces 29 of said wedge sections incline inwardly from the outer edges to the inner edges thereof thereby giving each wedge section a tapered or wedge shaped cross section. One of the wedge sections is provided upon its inner edge with a transverse groove 30, shown in Fig. 5 of the drawings and constituting a keyway to accommodate the key 5, whereby the wedge element is held against rotation upon the axle. The inclined or wedge face 29 of the wedge member 21 is provided with a recess or seat 31 in alinement with the keyway 30 for a purpose as will be later explained. Interposed between the wedge element and the adjacent end of the wheel hub there is a filler or washer element made up of two semicylindrical sections 32 and 33, one of which has been shown in detail in Fig. 6 of the drawings. As clearly shown in Figs. 1 and 2 of the drawings, the face 34 of each washer or filler section is disposed in a plane at right angles to the axis of the section so that these two straight portions may lie flat against the adjacent end of the wheel hub. The opposite face 35 of the washer or filler section is inclined so as to correspond with and fit directly against the inclined face 29 of the adjacent wedge element 28, whereby, upon tightening the nuts on the bolts 26 and 27, the wheel hub will be crowded snugly against the opposite abutment and thereby effectually held in place against movement longitudinally of the axle. The washer or filler section 33 is provided with a keyway 36 to accommodate the key 5. Upon the wedge or inclined face 35 of said filler section there is a boss or projection 37 which is designed to fit in the seat or recess 31 in the adjacent face of the adjacent wedge section 21, thereby to prevent rotation of the filler section and insuring the proper assemblage of the several parts.

The fixed abutments 6, only one of which has been shown, are spaced according to the standard gage of tracks, so that when the hub of the wheel is against the fixed abutment 6, as shown in Fig. 1 of the drawings, the wheel is set for standard gage. When the wheel is thus set, the removable abutment 10 is disposed so as to lap the wheel seat 2, and the wedge and filler element are interposed between the outer end of the wheel hub and the removable abutment.

By referring to Fig. 2 of the drawings, it will be seen that the wheel may be shifted to an intermediate position, without removing the removable abutment 10, merely by removing the wedge and filler elements, shifting the wheel over against the removable abutment 10, and replacing the wedge element and the filler element at the opposite side of the wheel between the fixed abutment 6 and the wheel hub.

A still further shifting of the wheel may be accomplished in the manner shown in Fig. 3, wherein it will be seen that the removable abutment 10 has been reversed and by reason of the offset position of the rib 11 the abutment laps the seat portion 2 at the outer side of the groove 7. This disposition of the removable abutment of course increases the space between the inner end of the hub and the wedge element, and to take care of this relation of parts, there is provided a filler element 38 of the necessary thickness.

By providing filler elements of different thicknesses, any desired intermediate adjustments of the wheel may be obtained.

What I claim is:

1. The combination of an axle having a wheel seat portion, a fixed abutment at one end of the seat portion, the opposite end of the seat portion having an annular groove, a reversible abutment including sections havings ribs to fit the groove, said ribs being offset with respect to the longitudinal center of the abutment, and means to secure the removable abutment sections in place.

2. The combination of an axle having a wheel seat portion, a fixed abutment at one end of the seat portion, the opposite end of the seat portion having an annular groove, a reversible abutment including sections having ribs to fit the groove, said ribs being offset with respect to the longitudinal center of the abutment, means to secure the removable abutment sections in place, and sectional wedge means embracing the seat portion.

3. The combination of an axle having a wheel seat portion provided with a fixed abutment and a reversible abutment, said reversible abutment having an interlocking engagement with the axle, and said engagement being offset with respect to the longitudinal center of the abutment.

4. The combination of an axle having a smooth cylindrical seat portion provided with a keyway, a fixed abutment for the seat portion, a reversible abutment for the seat-portion, said reversible abutment having an interlocking engagement with the axle, said engagement being offset with respect to the longitudinal center of the abutment, and sectional wedging means removably embracing the seat portion.

5. The combination of an axle having a wheel seat portion, a fixed abutment at one end of the seat portion, the opposite end of the seat portion having an annular groove, a removable abutment including sections having ribs to fit the groove and means to secure the removable abutment sections in place, and sectional wedge means embracing the seat portion and disposed between the abutments.

6. The combination of an axle having a wheel seat portion, a fixed abutment at one end of the seat portion, the opposite end of the seat portion having an annular groove, a removable abutment including sections having ribs to fit the groove and means to secure the removable abutment members in place, a wheel having a hub occupying the seat portion of the axle, and wedge means embracing the said seat portion between and bearing against one end of the hub and the adjacent abutment.

7. The combination of an axle having a wheel seat, a fixed abutment at one end of the seat, an annular groove at the other end of the seat, and a keyway extending across the annular groove, a key for the keyway and extending across the groove, and a removable sectional abutment embracing the wheel seat and having a rib engaging the groove, there being an interengagement between the key and the removable abutment to prevent endwise movement of the key and rotation of the abutment on the axle.

8. The combination of an axle having a wheel seat, a fixed abutment at one end of the seat and a keyway, a key for the keyway, and a removable abutment, there being an interengagement between the key and the removable abutment to prevent endwise movement of the key and rotation of the abutment.

9. The combination of an axle having a wheel seat, a fixed abutment and a keyway across the seat, a key for the keyway and provided with a recess, and a detachable sectional abutment embracing the seat and including a bolt connecting the abutment sections and engaging the recess of the key.

10. The combination of an axle having a wheel seat, provided with an annular groove and a keyway intersecting the groove, a detachable abutment including sections embracing the seat and provided with ribs engaging the groove, said abutment having a keyway registering with the keyway of the seat, bolts connecting the abutment sections, and a key received in the keyways of the seat and the abutment, said key also having a recess receiving one of the bolts.

11. The combination of an axle having a wheel seat, spaced abutments for the seat, one of the abutments removable, and wedging means embracing the seat and including wedge segments, wedge fillers and means for drawing together the wedge segments, the wedge segments and wedging fillers having mutually coacting wedge faces.

12. The combination of an axle having a wheel seat, a fixed abutment at the inner end of the seat, a reduced spindle at the outer end of the seat, a detachable abutment coöperating with the seat, and wheel wedging means embracing the seat for coöperation with one end of a hub of a wheel and one of the abutments.

In witness whereof I have hereunto signed my name.

HENRY F. A. KLEINSCHMIDT.

Copies of this patent may be obtained for five cents each, by addressing the "Commissioner of Patents, Washington, D. C."